United States Patent
Rossi (10) Patent No.: US 12,140,261 B2
(45) Date of Patent: Nov. 12, 2024

(54) CONDUIT-EXPLORING ROBOT COMPRISING A BEARING MODULE

(71) Applicant: AUTONOMOUS CLEAN WATER APPLIANCE (ACWA) ROBOTICS, Petreto-Bicchisano (FR)

(72) Inventor: Jean-François Rossi, Ville di Pietrabugno (FR)

(73) Assignee: AUTONOMOUS CLEAN WATER APPLIANCE (ACWA) ROBOTICS, Petreto-Bicchisano (FR)

( * ) Notice: Subject to any disclaimer, the term of this patent is extended or adjusted under 35 U.S.C. 154(b) by 318 days.

(21) Appl. No.: 17/760,574

(22) PCT Filed: Sep. 10, 2020

(86) PCT No.: PCT/EP2020/075401
§ 371 (c)(1),
(2) Date: Mar. 15, 2022

(87) PCT Pub. No.: WO2021/052869
PCT Pub. Date: Mar. 25, 2021

(65) Prior Publication Data
US 2022/0341533 A1    Oct. 27, 2022

(30) Foreign Application Priority Data

Sep. 16, 2019  (FR) ...................... 1910179

(51) Int. Cl.
*B25J 9/16*     (2006.01)
*F16L 55/34*    (2006.01)
(Continued)

(52) U.S. Cl.
CPC .............. *F16L 55/34* (2013.01); *B25J 9/16* (2013.01); *F16L 2101/10* (2013.01); *F16L 2101/30* (2013.01)

(58) Field of Classification Search
CPC ... F16L 55/34; F16L 2101/10; F16L 2101/30; B25J 9/16
(Continued)

(56) References Cited

U.S. PATENT DOCUMENTS 6,450,104 B1     9/2002   Grant et al.
2013/0104676 A1*  5/2013   Yang ......................... B25J 9/06
                                                   901/44

FOREIGN PATENT DOCUMENTS

CN     107191740 A  *  9/2017  .............. F16L 55/34
CN     207005570 A     2/2018
(Continued)

OTHER PUBLICATIONS

International Search Report issued in corresponding International Application No. PCT/EP2020/075401, dated Nov. 19, 2020, pp. 1-3, European Patent Office, Rijswijk, Netherlands.
(Continued)

*Primary Examiner* — Marrit Eyassu
(74) *Attorney, Agent, or Firm* — HAUPTMAN HAM, LLP (57) ABSTRACT

A robot for exploring a conduit including a first frame and a second frame. The first frame and the second frame each including a bearing module provided with a plurality of articulated arms. Each articulated arm including a bearing portion that can be applied against a wall of the conduit. Each bearing module is further configured to alternately switch from a bearing portion engaged configuration into a bearing portion disengaged configuration. The articulated arms are disposed in a plane perpendicular to the longitudinal axis x of the robot, and the articulated arms are capable of at least partially moving between said engaged configuration and said disengaged configuration, via a rotational motion about an axis parallel to the longitudinal axis x.

14 Claims, 4 Drawing Sheets

(51) Int. Cl.
   *F16L 101/10*     (2006.01)
   *F16L 101/30*     (2006.01)
(58) Field of Classification Search
   USPC .......................................... 73/865.8
   See application file for complete search history.

(56) References Cited

FOREIGN PATENT DOCUMENTS

| | | | |
|---|---|---|---|
| CN | 108223968 A | 6/2018 | |
| CN | 208417970 U | 1/2019 | |
| EP | 0484701 A1 * | 5/1992 | |
| EP | 2691684 B1 * | 5/2016 | ............ F16L 55/265 |
| JP | H0493188 A | 3/1992 | |
| KR | 100285888 B1 * | 4/2001 | |
| WO | 2012112835 A1 | 8/2012 | |
| WO | 2018064159 A1 | 4/2018 | |

OTHER PUBLICATIONS

Written Opinion issued in corresponding International Application No. PCT/EP2020/075401, dated Nov. 19, 2020, pp. 1-6, European Patent Office, Munich, Germany.

* cited by examiner

CONDUIT-EXPLORING ROBOT COMPRISING A BEARING MODULE

The present application is a U.S. National Phase of International Application Number PCT/EP2020/075401, filed Sep. 10, 2020, which claims priority to French Application No. 1910179, filed Sep. 16, 2019.

TECHNICAL FIELD

The present invention relates to the field of conduit-exploring robots. One particularly advantageous application lies in the field of conduit-exploring robots moving step-by-step.

PRIOR ART

Water supply networks are made up of mostly buried pipes, formed by assembling cylindrical sections. Water supply networks constitute large-scale infrastructures. For example, for a country such as France, these networks when combined cover close to one million linear kilometres. Globally, it is estimated that there are 30 million linear kilometres of such networks, which are growing every day.

These networks are very complex. They comprise numerous components including catchment and treatment units, reservoirs and impoundments, lift units, gridding and interconnections, as well as pipes and connections.

Among these components, pipes make up, in linear terms, the majority of the water supply networks. These pipes are very heterogeneous. More specifically, in the same region, sections of new networks can exist alongside others that are from up to a year to as much as two centuries old. This can lead to significant differences between pipes, in particular in terms of constituent materials, laying techniques, renewal frequencies and maintenance procedures.

Moreover, the conditions under which these pipes are used can be harsh. The internal pressure thereof is usually comprised between 3 and 20 bar, and the current water flow velocity can reach up to 2 or even 4 m/s.

The pipes are thus susceptible to degradation. There are many causes of degradation, in particular including external impacts, for example resulting from construction works or vehicle traffic, impacts related to the operation of the water network, for example during shut-off and re-open phases and in the event of significant pressure variations, internal abrasion caused by the presence of minerals in the water conveyed, corrosion and root intrusions.

This degradation leads to recurrent problems in the supply of potable water. In particular, it is estimated that 20-40% of the water conveyed between the point of abstraction and the point of delivery is lost. In order to increase the efficiency of these pipes, they must be able to undergo inspection so as to detect any degradation in order to carry out repairs.

However, the documentation available on these pipes is generally insufficient, in particular in rural areas. It is thus also necessary to map them, in order to carry out maintenance thereon.

However, the network must operate continuously. All operations that make the pipes unavailable must be scheduled and limited in time and frequency. The human interventions required to map and inspect these pipes, which will disrupt the operation of the water supply network, are thus difficult to implement.

One solution involves travelling through the inside of these pipes. Conduit-exploring robots are used to do this. These robots are thus designed to explore conduits, such as pipes in water supply networks, in order to collect information to map them or even inspect them for possible degradation. Moreover, this exploration can be carried out without cutting off supply from the network. These robots are thus intended to be exposed to the conditions of use of the pipes. They can in particular be placed under pressure and have to move with or against the flow of water.

Moreover, the common diameters of the conduits vary depending on the position thereof in the network. Nominal diameters of 30 mm are generally used for an individual connection, whereas the nominal diameters of the distribution conduits are generally comprised between 150 and 500 millimetres (mm). The robots are thus preferably configured such that they can adapt to a variation in the configuration of these conduits, so that they can explore the entirety of the supply networks.

A robot is known from the document CN 107191740 A, said robot moving in step-by-step and comprising a first frame and a second frame, the first and the second frame being capable of moving in translation relative to one another along the longitudinal axis of the robot. Moreover, the first frame and the second frame are provided with a bearing module. Each bearing module comprises side arms articulated in a pantograph structure, actuated by a piston via a sliding table, and each ending in a bearing plate capable of being applied against the wall of a conduit. Each side arm comprises a fixed rod and a sliding rod. The piston moves the sliding rod of the side arm closer to or further away from the fixed rod via a translational motion parallel to the longitudinal axis of the robot. The articulated arms are thus capable of moving between a retracted position and a deployed position.

The use of articulated arms allows the length thereof to be adjusted in extension, so as to engage the frame with a wall of a conduit. The first or the second frame can then be moved in translation to allow the robot to advance.

The document US 2013/10467 A1 and the European patent No. 0484701 A1 each describe a conduit-exploring robot moving step-by-step, wherein the deployment of the bearing module is achieved by a sliding crank mechanism. By means of connecting rods, the rotation of a crank drives the arms such that they translate perpendicularly to the longitudinal axis of the robot.

The document CN 208417970 U describes a conduit-exploring robot comprising bearing modules. Each bearing module comprises articulated arms formed by two rods mounted such that they rotate relative to the frame and connected by a connecting roller.

The document JP H0493188 A describes a conduit-exploring robot whose bearing module comprises a rotating crank, with three arms. Each arm is connected by a pivot to a connecting rod. When the crank is rotated, the displacement of each connecting rod is guided by a lug sliding in a rail extending along each connecting rod.

However, these bearing modules can still be improved on in terms of the overall dimensions and solidity thereof. Moreover, the amplitude of extension of the bearing module and/or the stability of the bearing against the wall of the conduit can still be improved on.

One purpose of the present invention is thus to improve the bearing module of a conduit-exploring robot. In particular, one non-limiting purpose of the present invention can be to improve the compactness of a conduit-exploring robot. Another non-limiting purpose of the present invention can be to improve the bearing of the robot against the wall of a conduit.

Other purposes, features and advantages of the present invention will appear upon reading the following description and the accompanying drawings. It is understood that other advantages can be incorporated therein.

SUMMARY

In order to achieve this objective, according to a first aspect, the invention proposes a conduit-exploring robot comprising a first frame and a second frame, the first frame and the second frame each comprising a bearing module provided with a plurality of articulated arms, each articulated arm comprising a bearing portion that can be applied against a wall of the conduit, the bearing portion being able to be displaced by a movement of an articulated arm, each bearing module being configured to switch alternately from a bearing portion engaged configuration into a bearing portion disengaged configuration, each articulated arm being deployed further in said engaged configuration than in said disengaged configuration, characterised in that each bearing module is configured such that the articulated arms are disposed in a plane perpendicular to a longitudinal axis of at least one of either the first frame or the second frame, and such that the articulated arms are capable of at least partially moving between said engaged configuration and said disengaged configuration, via a rotational motion, through at least one angular sector, about an axis parallel to the longitudinal axis of the at least one of either the first frame or the second frame.

Thus, the rotational motion about the longitudinal axis of at least one of either the first frame or the second frame allows the articulated arms to be deployed in a plane perpendicular to the longitudinal axis of said frame, rather than in a plane including this longitudinal axis. Thus, the overall dimensions of the bearing module are reduced, at least along this longitudinal axis. A good level of compactness of the robot can be achieved. The robot's reduced length can advantageously make it easier to manoeuvre in winding conduits. Alternatively and advantageously, the bearing module according to these features can increase the robot's capacity to carry devices, comprising for example sensors, for the same final size of the robot.

Advantageously, each articulated arm comprises a first rod and a second rod, the first rod being configured to be articulated such that it rotates with the second rod in a direction parallel to the longitudinal axis of the at least one of either the first frame or the second frame, by at least a distal pivot and a proximal pivot. Thus, each articulated arm is capable of alternately moving between a retracted position and a deployed position. Moreover, the proximal pivot and the distal pivot reinforce the structure of the articulated arm. Good bearing stability is achieved when the bearing module is in the bearing portion engaged configuration. The bearing of the robot against the wall is thus improved. Moreover, the use of two pivot links improves the compactness of the articulated arm in its retracted configuration, while increasing the elongation thereof in its deployed configuration.

According to a second aspect, the invention proposes a conduit-exploring robot comprising a first frame and a second frame, the first frame and the second frame each comprising a bearing module provided with a plurality of articulated arms, each articulated arm comprising a bearing portion that can be applied against a wall of the conduit, the bearing portion being able to be displaced by a movement of an articulated arm, each bearing module being configured to switch alternately from a bearing portion engaged configuration into a bearing portion disengaged configuration, each articulated arm being deployed further in said engaged configuration than in said disengaged configuration, characterised in that each articulated arm comprises a first rod and a second rod, a distal end of the first rod being configured so as to be articulated such that it rotates with the distal end of the second rod in a direction parallel to the longitudinal axis of a frame, by at least one distal pivot, the distal end of the second rod forming the bearing portion of each articulated arm.

The use of articulated arms according to these features procures a good bearing stability when the bearing module is in the bearing portion engaged configuration, compared to arms comprising only a rod to be deployed. Moreover, the bearing portion of the bearing module provides a limited contact surface with the wall of the conduit, or even a single-point contact, when the bearing module is in the bearing portion engaged configuration. The force exerted by the bearing portion on the wall of the conduit is thus concentrated. The bearing module can also be less sensitive to irregularities in the wall of the conduit. The bearing of the robot against the wall is thus improved.

BRIEF DESCRIPTION OF THE FIGURES

The aims, purposes, features and advantages of the invention will be better understood upon reading the detailed description given of one embodiment thereof, which is illustrated by means of the following accompanying drawings, in which.

The drawings are provided by way of example and are not intended to limit the scope of the invention. They constitute diagrammatic views intended to ease the understanding of the invention and are not necessarily to the scale of practical applications.

DETAILED DESCRIPTION

Before giving a detailed review of embodiments of the invention, optional features are set out below, which can be used in combination with or in replacement of one another.

According to one example, a distal end of the first rod can be articulated with a distal end of the second rod by the distal pivot. The distal end of the first rod and the distal end of the second rod can also form the bearing portion of each articulated arm. The bearing portion formed by the ends of the first rod and of the second rod provides a limited contact surface with the wall of the conduit, or even a single-point contact, when the bearing module is in the bearing portion engaged configuration. The force exerted by the bearing portion on the wall of the conduit is thus concentrated. The bearing module can also be less sensitive to irregularities in the wall of the conduit. The bearing of the robot against the wall is thus further improved.

According to one example, the first rod and the second rod can each comprise a distal portion and a proximal portion, the distal portion and the proximal portion being articulated such that they rotate by an intermediate pivot, in a direction parallel to the longitudinal axis of the at least one of either the first frame or the second frame. The intermediate pivot can be located between the distal pivot and the proximal pivot, along each of the first rod and second rod. The intermediate pivot maximises the compactness of the articulated arm in its retracted configuration, while maximising the elongation thereof in its deployed configuration, and further reinforcing the structure of the articulated arm.

According to one example, the bearing module can comprise a drive mechanism and a motor block, the drive mechanism being configured to be driven by the motor block, and to induce the rotational motion of at least part of each articulated arm when switching alternately from said engaged configuration into said disengaged configuration. The use of a motor block to drive the drive mechanism further reduces the overall dimensions of the bearing module, in particular when compared to the use of a piston. The compactness of the robot can thus be improved.

Preferably, the drive mechanism can be configured to be driven by the motor block, and induce the rotational motion of at least part of each articulated arm when switching alternately from said engaged configuration into said disengaged configuration, the rotational motion of at least part of each articulated arm being simultaneous between each articulated arm of the bearing module. Thus, when switching from the bearing portion disengaged configuration into the bearing portion engaged configuration, the position and orientation in the conduit of one of either the first frame or the second frame is maintained.

According to one example, each articulated arm can comprise a first rod and a second rod, the first rod being capable of being configured to be articulated such that it rotates with the second rod, in a direction parallel to the longitudinal axis of the at least one of either the first frame or the second frame, the drive mechanism can comprise a first ring gear, the first rod of each articulated arm being capable of being mounted on the first ring gear so as to be free to rotate, through at least one angular sector, relative to the first ring gear about an axis parallel to said longitudinal axis.

The first ring gear can further be configured to be driven such that it rotates in a first direction of rotation when switching from said disengaged configuration into said engaged configuration, and in a second direction when switching from said engaged configuration into said disengaged configuration, the second direction of rotation being opposite to the first direction of rotation. Thus, at least one rod of the articulated arm can be driven in rotation, allowing for the rotational motion of at least part of each articulated arm. Moreover, since the ring gear is driven in rotation by the motor block, the overall dimensions of the bearing module are further reduced, in particular along the longitudinal axis of the robot.

According to one example, the drive mechanism can further comprise a reduction gear, configured at least to induce rotation of the first ring gear.

According to this example, the motor block can comprise a pinion, and the reduction gear can comprise a first gear cooperating on the one hand with the pinion so as to be driven such that it rotates about an axis of rotation parallel to the longitudinal axis of the pinion, and on the other hand with the first ring gear.

According to one example, the drive mechanism can further comprise a second ring gear, the second rod being capable of being mounted on the second ring gear so as to be free to rotate, through at least one angular sector, relative to the second ring gear, about an axis parallel to the longitudinal axis of the at least one of either the first frame or the second frame.

The second ring gear can be configured to be driven in the second direction of rotation when switching from said disengaged configuration into said engaged configuration, and in the first direction when switching from said engaged configuration into said disengaged configuration. Thus, the second rod can also be driven in rotation when switching alternately from the engaged configuration into the disengaged configuration. The movement of each articulated arm can thus be faster than when only one rod of each articulated arm is capable of moving in rotation. Moreover, the contact of the bearing portion with the wall of the conduit is made radially. This allows the bearing module to be less sensitive to irregularities in the wall of the conduit and to better adapt to variations in pipe diameter. The bearing of the robot against the wall is further improved.

According to one example, the drive mechanism can comprise a reduction gear, and the reduction gear can comprise a first gear cooperating on the one hand with the pinion, so as to be driven such that it rotates about an axis of rotation parallel to the longitudinal axis of the pinion, and on the other hand with the first ring gear, the reduction gear can further comprise a second gear cooperating on the one hand with the first gear, so as to be driven such that it rotates about an axis of rotation parallel to the longitudinal axis of the pinion, and on the other hand with the second ring gear. Thus, the second ring gear can be driven such that it rotates in a direction opposite to the direction of rotation of the first ring gear, by the same motor block. This avoids the need for a second motor block to drive the second ring gear, thus minimising the overall dimensions of the bearing module. Moreover, the rotational motions of the first rod and of the second rod can thus be synchronised when switching alternately from the engaged configuration into the disengaged configuration.

According to one example, the bearing module can comprise at least one assembly element configured to maintain the drive mechanism assembled.

According to one example, the drive mechanism comprising a first ring gear and a second ring gear, the first ring gear and the second ring gear being disposed between a first plate and a second plate, the at least one assembly element can be mounted on the first plate and the second plate so as to maintain the drive mechanism assembled.

According to one example, the at least one assembly element can comprise a first fastening element mounted on the first plate, a second fastening element mounted on the second plate, and a panel mounted on the first fastening element and the second fastening element, the panel being configured such that it is not directly in contact with the first ring gear and the second ring gear.

According to one example, the first rod and the second rod can be respectively articulated with the first ring gear and the second ring gear by a connecting pivot about an axis parallel to the longitudinal axis of at least one of either the first frame or the second frame, so as to allow a rotational motion, through at least one angular sector, of the first rod and of the second rod, about the axis parallel to the longitudinal axis of the robot, relative to the at least one of either the first frame or the second frame. According to this example, the articulation of the first rod and of the second rod can be abutted against one of the plurality of travel limit stops of each articulated arm when switching from said engaged configuration into said disengaged configuration.

According to one example, the motor block can comprise a stepper motor or geared stepper motor, and an encoder. The encoder can cooperate with the stepper motor or geared stepper motor, so as to measure a degree of deployment of the articulated arms, when alternately switching from the bearing portion disengaged configuration into the bearing portion engaged configuration. The diameter of the pipe can thus be measured by the robot using the bearing module, via the encoder.

It is specified that within the scope of the present invention, the term "bearing portion" refers to a portion of the robot, and more particularly of a bearing module, intended to bear against the wall of a conduit.

The longitudinal axis x of the robot corresponds to an axis passing through the centres of the first frame and of the second frame, when the first frame and the second frame are aligned. Thus, the longitudinal axis x can equivalently refer to the longitudinal axis of the robot and/or the longitudinal axis of the first frame, and/or the longitudinal axis of the second frame, when the first frame and the second frame are aligned. When the first frame and the second frame are not aligned, the longitudinal axis of the robot can be divided into two longitudinal axes x and x', the longitudinal axis x being the longitudinal axis of the first frame and the longitudinal axis x' being the longitudinal axis of the second frame. When in use, the longitudinal axis x can be oriented along a long dimension of the conduit to be explored.

When an axis is "parallel" to another axis or to a direction, that axis can be parallel to, or coincident with, the other axis or the direction considered.

The "inner rim" of a ring gear is understood to mean the rim thereof that is disposed facing the centre of the ring gear, i.e. the rim located the closest to this centre, in a direction radial to the ring gear. The "outer rim" of a ring gear is understood to mean the rim thereof that is located the furthest from the centre of the ring gear in a direction radial to the ring gear.

The "outer diameter" of a pinion or gear is understood to mean the diameter of a circle that includes the ends of the teeth of the pinion or gear.

A parameter that is "substantially equal to/greater than/less than" a given value is understood to mean that this parameter is equal to/greater than/less than the given value, to within plus or minus 10%, or even to within plus or minus 5% of this value.

The conduit-exploring robot, according to one example embodiment of the invention, will now be described.

Figure 1:
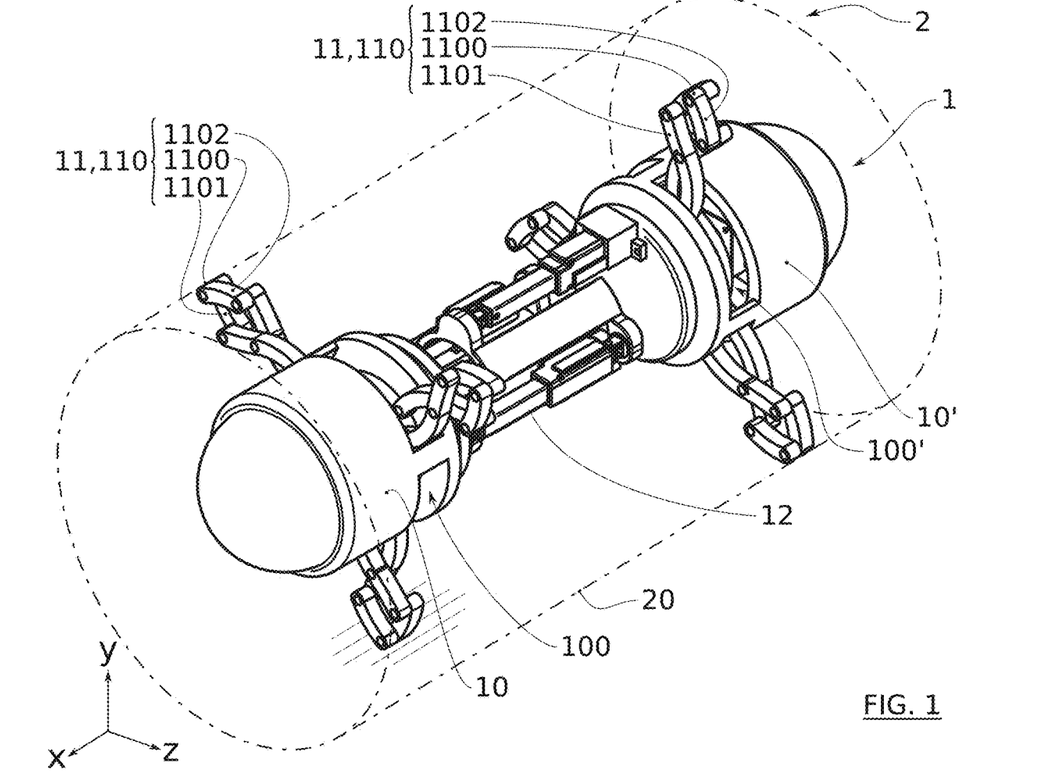
FIG. 1 shows a perspective, assembled view of the conduit-exploring robot according to one embodiment of the invention.

According to this embodiment, and as shown in FIG. 1, the robot 1 comprises a first frame 10 and a second frame 10'. The first frame 10 and the second frame 10' each comprise a bearing module 11. The bearing module 11 is configured to cause at least one of either the first frame 10 or the second frame 10' to bear against a wall 20 of a conduit 2, via a bearing portion 1100 that can be applied against the wall 20. More particularly, the bearing module 11 can be configured to alternately switch at least one of either the first frame 10 or the second frame 10' from a bearing portion 1100 engaged configuration into a bearing portion 1100 disengaged configuration.

The robot 1 can further comprise a positioning system 12, connecting the first frame 10 and the second frame 10'. The positioning system can in particular be configured to allow for the relative positioning of the first frame 10 and of the second frame 10'.

The robot 1 can be displaced step-by-step, the kinematics whereof will now be described for a forwards movement of the robot 1, along the longitudinal axis of the conduit 2. According to this embodiment, in order to allow the robot 1 to move forward, the displacement kinematics can be described through two main phases: a deployment phase and a retraction phase.

During the deployment phase, the bearing module 11 of the second frame 10' is in the bearing portion 1100 engaged configuration. The second frame 10' is thus fixed relative to the conduit 2. The bearing module 11 of the first frame 10 is furthermore in the bearing portion 1100 disengaged configuration. The positioning system 12 can be actuated so as to position the first frame 10 relative to the second frame 10'. For example, the first frame 10 is moved away from the second frame 10' along the longitudinal axis of the conduit 2, which is coincident with the longitudinal axis x of the robot 1 in FIG. 1. When the first frame 10 is positioned in this manner, with the second frame 10' still in the bearing portion 1100 engaged configuration, the bearing module 11 of the first frame 10 can be switched into the engaged configuration. The first frame 10 is thus fixed relative to the conduit 2.

During the retraction phase, the module 11 of the second frame 10' can be switched into the disengaged configuration. The positioning system 12 can be actuated so as to position the second frame 10' relative to the first frame 10. For example, the second frame 10' is moved closer to the first frame 10 along the longitudinal axis of the conduit 2. When the second frame 10' is positioned in this manner, with the first frame 10 still in the bearing portion 1100 engaged configuration, the bearing module 11 of the second frame 10' can be switched into the engaged configuration. The second frame 10' is thus fixed relative to the conduit 2.

These deployment and retraction phases can follow on from one another to allow the robot to advance. It should be noted that depending on which of the first frame 10 and the second frame 10' is in the disengaged configuration at the start of the movement, the displacement of the robot 1 can be carried out along the longitudinal axis of the robot 1, and more particularly along the longitudinal axis of the conduit, in a forwards or backwards direction. The robot 1 can thus explore a network of conduits, for example it can reverse when it reaches a dead end. The robot 1 can furthermore return to its starting point, for example the point at which the robot 1 was inserted into the conduit 2, in order to be retrieved. Thus, the pipes can be explored even when the number of access points to these pipes is limited.

The bearing module 11 of the first frame 10 is described in the description hereinbelow. It is understood that the described features are also applicable to the bearing module 11 of the second frame 10'. In the description hereinbelow, the bearing portion 1100 engaged configuration is referred to as the "engaged configuration", and the bearing portion 1100 disengaged configuration is referred to as the "disengaged configuration".

In order for the first frame 10 to alternately switch from the engaged configuration into the disengaged configuration, the bearing module 11 is provided with a plurality of articulated arms 110, each articulated arm 110 comprising the bearing portion 1100. The bearing portion 1100 can furthermore be displaced by a movement of an articulated arm 110. In the engaged configuration, each articulated arm 110 is deployed further than in the disengaged configuration. In the engaged configuration, each articulated arm 110 can be deployed such that the bearing portion 1100 bears against the wall 20 of the conduit 2.

Figure 2:
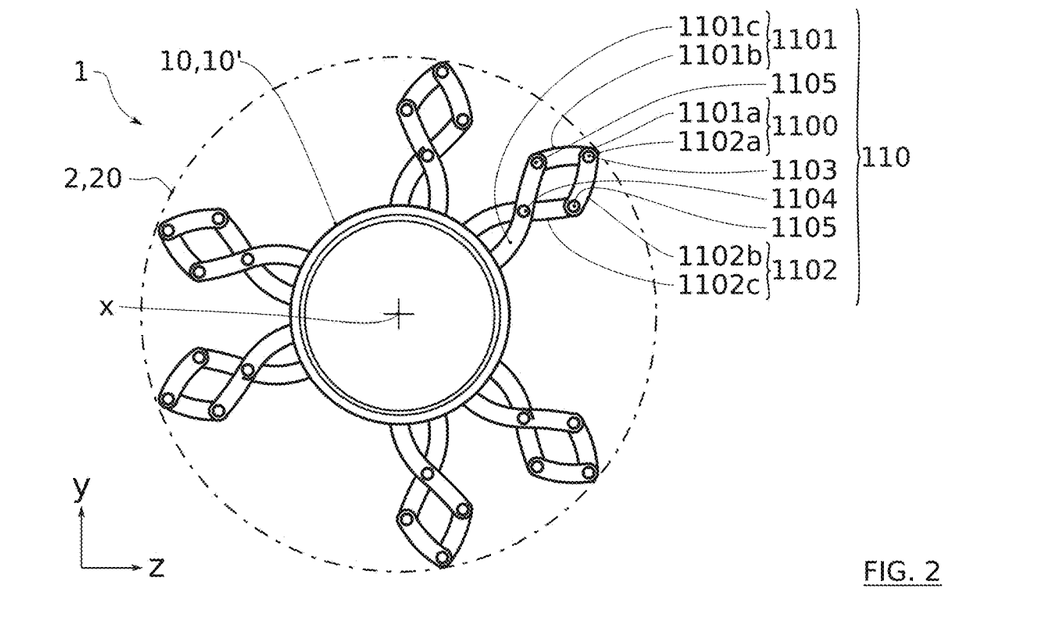
FIG. 2 shows an assembled view transverse to the longitudinal axis of the robot shown in FIG. 1, in a bearing portion engaged configuration.
Figure 3:
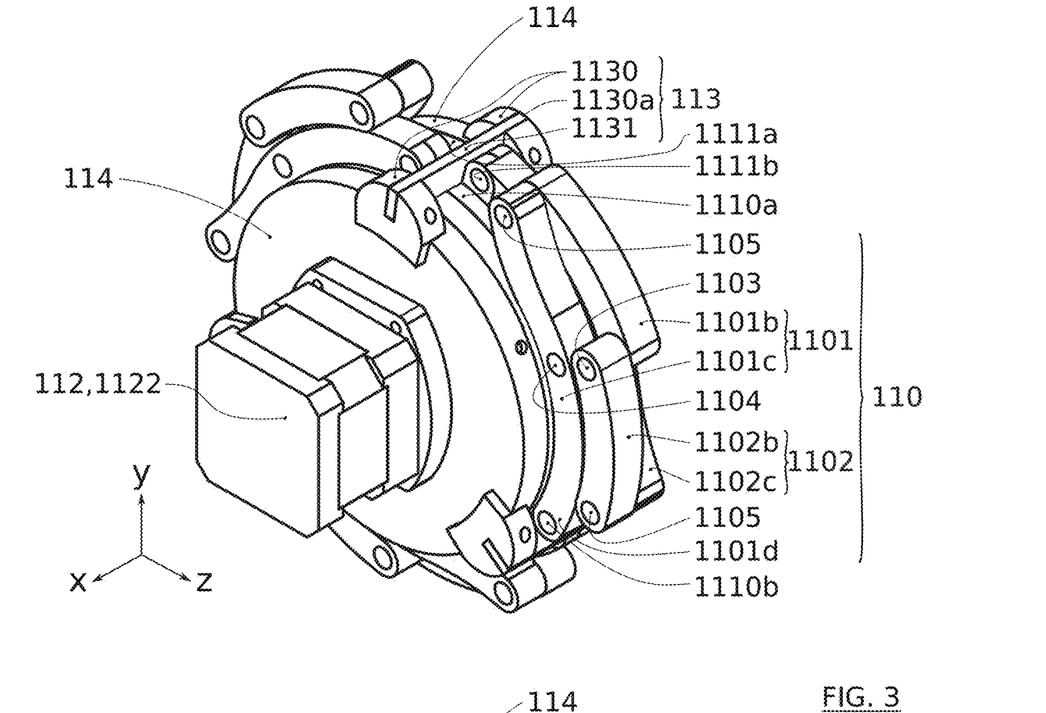
FIG. 3 shows a perspective, assembled view of a part of the robot shown in FIG. 1, comprising the bearing module in a bearing portion disengaged configuration.
Figure 4:
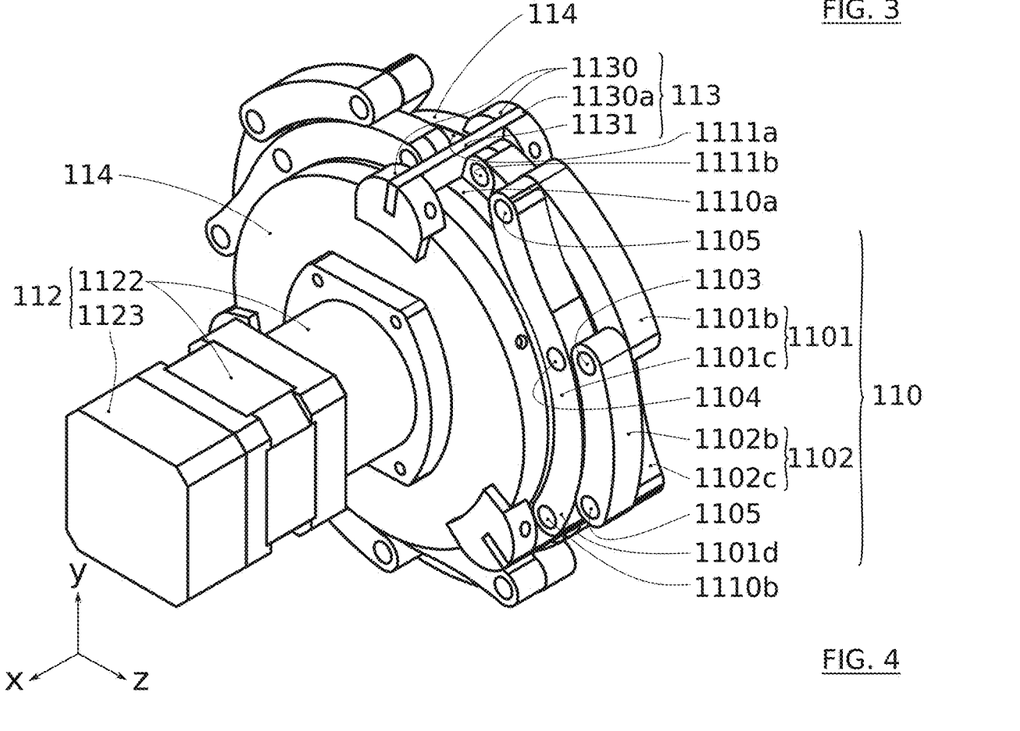
FIG. 4 shows a perspective, assembled view of a part of the robot shown in FIG. 1, comprising the bearing module according to another embodiment, in a bearing portion disengaged configuration.

More particularly, the bearing module 11 comprises a plurality of articulated arms disposed in a plane perpendicular to the longitudinal axis x of the first frame 10. Each articulated arm 110 is capable of moving at least in part between the engaged configuration and the disengaged configuration, via a rotational motion through at least one angular sector, about an axis parallel to the longitudinal axis x of the first frame 10. Each articulated arm 110 is thus capable of being deployed in a main direction perpendicular to the longitudinal axis of the first frame 10, between a retracted position, for example as shown in FIGS. 3 and 4, and an at least partially deployed position, for example as shown in FIG. 2, wherein each articulated arm 110 is deployed so as to cause the bearing portion 1100 to bear against the wall 20 of the conduit 2. According to the example shown in the figures, each bearing module 11 comprises three articulated arms disposed radially relative to the frame and equidistant from one another. The mobility of the arms is shown to be advantageously synchronous.

The structure of the articulated arms will now be described with reference to FIGS. 2 and 3. In order for each articulated arm 110 to be at least partially capable of moving alternately between a retracted position and an at least partially deployed position, each articulated arm 110 can comprise a first rod 1101 and a second rod 1102. The first rod 1101 can be configured to be articulated such that it rotates with the second rod 1102 via a distal pivot 1103 and a proximal pivot 1104. In general, an articulated joint forms a connecting link between a plurality of elements, allowing them to move relative to one another. Each pivot forms an articulated joint joining the elements that it rotates. The distal pivot 1103 and the proximal pivot 1104 can each allow the first rod 1101 and the second rod 1102 to rotate relative to one another about an axis parallel to the longitudinal axis of the first frame 10. More particularly, the first rod 1101 and the second rod 1102 can each comprise a distal portion 1101b, 1102b and a proximal portion 1101c, 1102c. The distal portion 1101b, 1102b and the proximal portion 1101c, 1102c of each of the first rod 1101 and the second rod 1102 can be articulated by an intermediate pivot 1105 such that they rotate about an axis parallel to the longitudinal axis of the first frame 10. The intermediate pivot 1105 can preferably be located between the distal pivot 1103 and the proximal pivot 1104, along each of the first rod 1101 and second rod 1102.

As shown in FIG. 3, the first rod 1101 and the second rod 1102 of each articulated arm 110 can further be articulated such that they overlap, at least when the articulated arm 110 is in the retracted position thereof. For this purpose, the proximal portion 1101c of the first rod 1101 and the distal portion 1102b of the second rod 1102 can be disposed in the same first plane, and the proximal portion 1102c of the second rod 1002 and the distal portion 1101b of the first rod 1101 can be disposed in the same second plane, which is different from the first plane. The compactness of the articulated arm 110 is thus improved, at least in the retracted position thereof.

Moreover, each articulated arm 110 can be configured to make limited, or even single-point surface contact with the wall 20 of the conduit 2. For this purpose, and as shown in FIG. 2, the distal portion 1101b of the first rod 1101 and the distal portion 1102b of the second rod 1102 can be articulated at the distal end 1101a, 1102a thereof by the distal pivot 1103.

Figure 5:
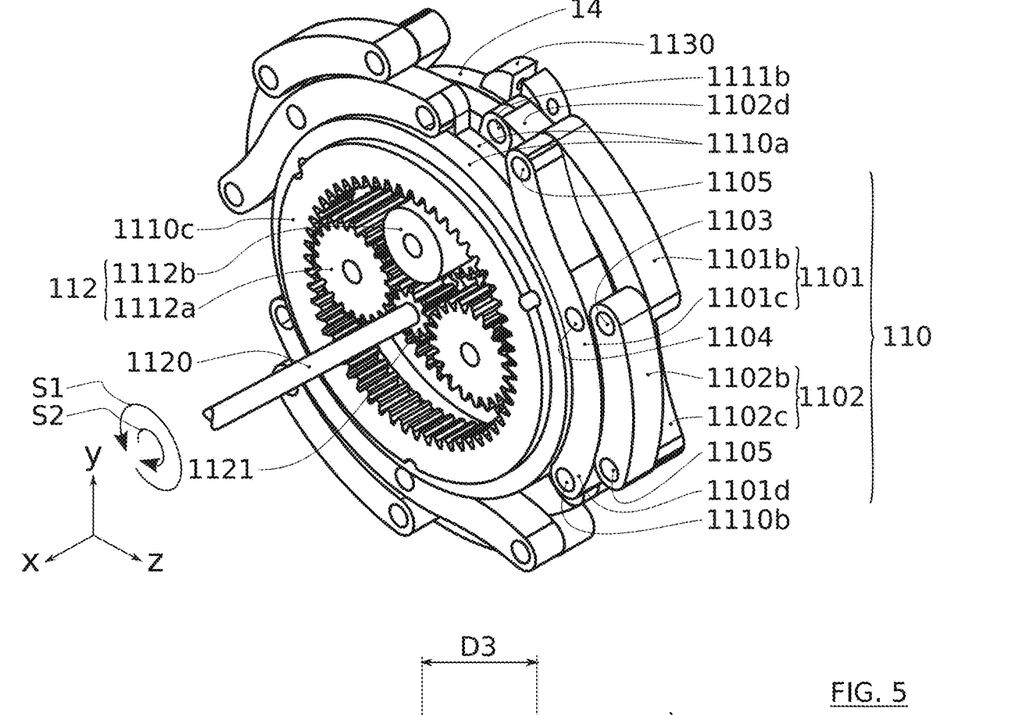
FIG. 5 shows a perspective, assembled view of a part of the bearing module according to the embodiments shown in FIGS. 3 and 4.

In order to allow each articulated arm 110 to move alternately between a retracted position and an at least partially deployed position, the bearing module 11 can comprise a drive mechanism 111. This drive mechanism 111 can be driven by a motor block 112, comprising a motor 1122, as shown in FIG. 3, or a geared motor 1122, as shown in FIG. 4. The motor block 112 can further comprise a drive shaft 1120 suitable for transmitting the rotational motion of the motor or geared motor 1122 to the drive mechanism 111. As shown in FIG. 5, the drive shaft 1120 can be disposed along the longitudinal axis of the first frame 10.

As shown in FIGS. 5 to 8, the drive mechanism 11 can comprise a first ring gear 1110 and a second ring gear 1111. The first rod 1101 and the second rod 1102 of each articulated arm 110 can be mounted such that they are free to rotate on the first ring gear 1110 and the second ring gear 1111 respectively. The first ring gear 1110 can be configured to be driven such that it rotates in a first direction of rotation S1 when switching from the disengaged configuration into the engaged configuration, and in a second direction S2 when switching from the engaged configuration into the disengaged configuration, the second direction of rotation S2 being opposite to the first direction of rotation S1, as shown in FIG. 5 for example. The second ring gear can be configured to be driven in the second direction of rotation S2 when switching from the disengaged configuration into the engaged configuration, and in the first direction S1 when switching from the engaged configuration into the disengaged configuration. As the first rod 1101 and the second rod 1102 of each articulated arm 110 can be mounted such that they are free to rotate on the first ring gear 1110 and the second ring gear 1111 respectively, and as the first rod 1101 can be configured to be articulated such that it can rotate with the second rod 1102 via a distal pivot 1103 and a proximal pivot 1104, it is understood that the rotational motion of each of the first ring gear 1110 and the second ring gear 1111 involves a change in the angular position of the first rod 1101 and of the second rod 1102. Thus, the articulated arm 110 can be switched alternately from a retracted position to an at least partially deployed position.

For this purpose, and as shown in FIGS. 3 and 4, the first ring gear 1110 comprises an outer rim 1110a, on which the proximal portion 1101c of the first rod 1101 of each articulated arm 110 is mounted, preferably via the proximal end 1101d thereof. As each first rod 1101 of the articulated arms 110 is mounted on the first ring gear 1110, it is understood that, in a bearing module 11, the movements of each first rod 1101 of the articulated arms 110 are simultaneous. The outer rim 1110a can more particularly comprise an articulated joint, and more particularly a connecting pivot 1110b, allowing this proximal end 1101d to be made integral with the first ring gear 1110, while allowing the proximal portion 1101c of the first rod 1101 to rotate about an axis parallel to the longitudinal axis x of the first frame 10.

Moreover, and as shown in FIGS. 3 and 4, the second ring gear 1111 can comprise an outer rim 1111a, on which the proximal portion 1102c of the second rod 1102 is mounted, preferably via the proximal end 1102d thereof. As each second rod 1102 of the articulated arms 110 is mounted on the second ring gear 1111, it is understood that, in a bearing module 11, the movements of each second rod 1102 of the articulated arms 110 are simultaneous. The outer rim 1111a can more particularly comprise an articulated joint, and more particularly a connecting pivot 1111b, allowing this proximal end 1102d to be made integral with the second ring gear 1111, while allowing the proximal portion 1102c of the second rod 1102 to rotate about an axis parallel to the longitudinal axis x of the first frame 10.

Furthermore, the outer rims 1110a, 1111a of the first ring gear 1110 and of the second ring gear 1111 can be juxtaposed and aligned along the longitudinal axis of the first frame 10.

The bearing module 11 can comprise two plates 114 between which the drive mechanism 111 is mounted. The two plates 114 can be disposed on either side of the assembly formed by the first ring gear 1110 and the second ring gear 1111, as shown in FIG. 3.

In order to hold the two plates 114 and the assembly formed by the first ring gear 1110 and the second ring gear 1111 in place, the bearing module can comprise at least one assembly element 113. Preferably, a plurality of assembly elements can be disposed around the outer rims 1110a, 1111a of the first ring gear 1110 and of the second ring gear 1111. Each of the assembly elements 113 can be fastened to each plate 114 by a fastening element 1130. Thus, for each assembly element 113, two fastening elements 1130 can be disposed facing one another in a direction parallel to the longitudinal axis of the first frame 10. Each fastening element 1130 can comprise an aperture 1130a that is radial to the first ring gear 1110 and to the second ring gear 1111. A panel 1131 can be inserted into the aperture 1130a in the two fastening elements 1130 disposed facing one another, such that the panel 1131 is transverse to the outer rims 1110a, 1111a of the first ring gear 1110 and of the second ring gear 1111.

The panel 1131 can further be configured not to directly come into contact with the first ring gear 1110 and the second ring gear 1111. For this purpose, the proximal longitudinal edge of the panel 1131 can comprise a recess. Alternatively, a ball bearing can be disposed between the panel 1131 and the assembly formed by the first ring gear 1110 and the second ring gear 1111. Thus, the rotation of the first ring gear 1110 and of the second ring gear 1111 about the longitudinal axis x of the first frame 10 induces little or no friction on the panel 1131. The two plates 114 and the assembly formed by the first ring gear 1110 and the second ring gear 1111 can be held in place even when the drive mechanism 111 is in operation.

Advantageously, the assembly formed by the first ring gear 1110 and the second ring gear 1111 and the plates 114 can define a watertight interior volume within which the gear movements occur. It should be noted that the articulated arms 110 are only mounted on the first ring gear 1110 and the second ring gear 1111 from the outside, thus preventing any sealing difficulties at this point. Alternatively or additionally, the assembly formed by the motor block 112 on a plate 114 can define a watertight interior volume to ensure correct operation of the motor block 112.

The bearing module 11 can further comprise a plurality of stops configured to stop the drive mechanism 111, in order to stop the rotational motion of each articulated arm 110, at the travel limit of each articulated arm 110, when switching from the engaged configuration into the disengaged configuration. Thus, the stop prevents the rotation of at least part of each articulated arm beyond the travel limit, i.e. when each articulated arm is in a retracted position. The risk of damaging the articulated arms by actuating them beyond the retracted position thereof is thus limited or even entirely prevented. For example, the assembly element 113 can further act as a stop.

For this purpose, a plurality of stops can be disposed around the outer rims 1110a, 1111a of the first ring gear 1110 and of the second ring gear 1111. For example, and as shown in FIGS. 3 and 4, three stops 113 can be disposed so as to stop the rotation of the first ring gear 1110 and of the second ring gear 1111 by abutting the connecting pivots 1110b, 1111b connecting the three articulated arms 110, when each articulated arm 110 is in the retracted position thereof. For this purpose, each of the stops 113 can be fastened to each plate 114 by a fastening element 1130. Thus, for each stop 113, two fastening elements 1130 can be disposed facing one another in a direction parallel to the longitudinal axis of the first frame. Each fastening element 1130 can comprise an aperture 1130a that is radial to the first ring gear 1110 and to the second ring gear 1111. A panel 1131 can be inserted into the aperture 1130a in the two fastening elements 1130 disposed facing one another, such that the panel 1131 is transverse to the outer rims 1110a, 1111a of the first ring gear 1110 and of the second ring gear 1111. Thus, according to the example shown in FIG. 3, the connecting pivots 1110b, 1111b connecting the three articulated arms 110, can be brought into abutment on the panel 1131, when each articulated arm 110 is in the retracted position thereof.

In order for the first ring gear 1110 and the second ring gear 1111 to be driven in rotation and induce the movement of the articulated arms 110, the first ring gear 1110 and the second ring gear can each comprise an inner rim 1110c, 1111c. As shown in FIG. 5, this inner rim 1110c, 1111c can have teeth so that it can be driven such that it rotates about the longitudinal axis of the first frame 10 upon rotation of the drive shaft 1120 of the motor block 112. The drive mechanism can further comprise a reduction gear 1112 for coupling the drive shaft 1120 and each of the inner rims 1110c, 1111c of the first ring gear 1110 and of the second ring gear 1111. This reduction gear 1112 can more particularly be configured to drive the rotation of the first ring gear 1110 and the rotation of the second ring gear 1111 in opposite directions of rotation.

Figure 6:
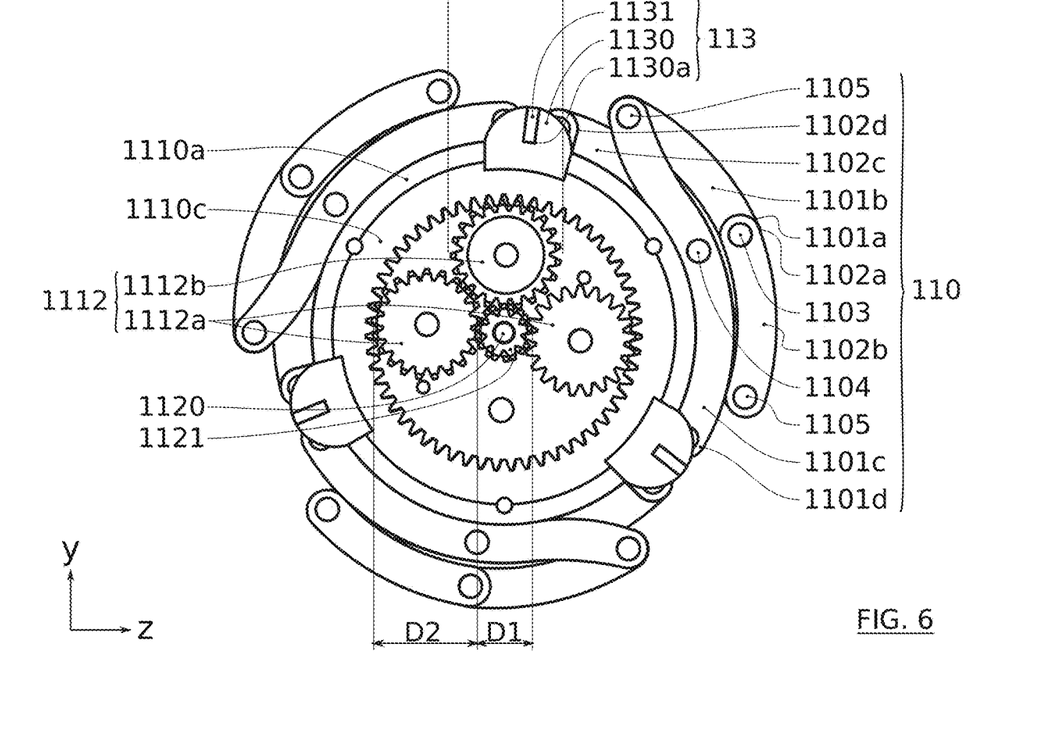
FIG. 6 shows an assembled view transverse to the longitudinal axis of the robot, of the part of the bearing module shown in FIG. 5.

For this purpose, the drive shaft 1120 is integral with a pinion 1121 having an outer diameter D1, as shown in FIG. 6. Thus, the drive shaft 1120 drives the pinion 1121 such that it rotates about the longitudinal axis of the first frame 10. For example, when switching from the disengaged configuration into the engaged configuration, the centre pinion 1121 is driven by the drive shaft 1120 such that it rotates in the first direction S1, as shown in FIG. 5.

The reduction gear 1112 can comprise a first gear 1112a, the outer diameter D2 whereof is greater than the outer diameter D1 of the pinion 1121, and which cooperates with the pinion 1121, as shown in FIG. 6. The first gear can further cooperate with the inner rim 1110c of the first ring gear 1110. For example, when switching from the disengaged configuration into the engaged configuration, the first gear 1112a is driven such that it rotates about an axis parallel to the longitudinal axis of the first frame 10, in the first direction S1. The first ring gear 1110 is then driven such that it rotates in the first direction S1, allowing the articulated arms 110 to be deployed, as shown in FIG. 5. Preferably, the reduction gear 1112 comprises a first pair of gears 1112a, disposed on either side of the pinion 1121 in a plane perpendicular to the longitudinal axis x of the first frame 10. The use of a first pair of gears 1112a in particular improves the solidity of the drive mechanism 111 by ensuring good alignment between the drive shaft 1120 and the first ring gear 1110.

Figure 7:
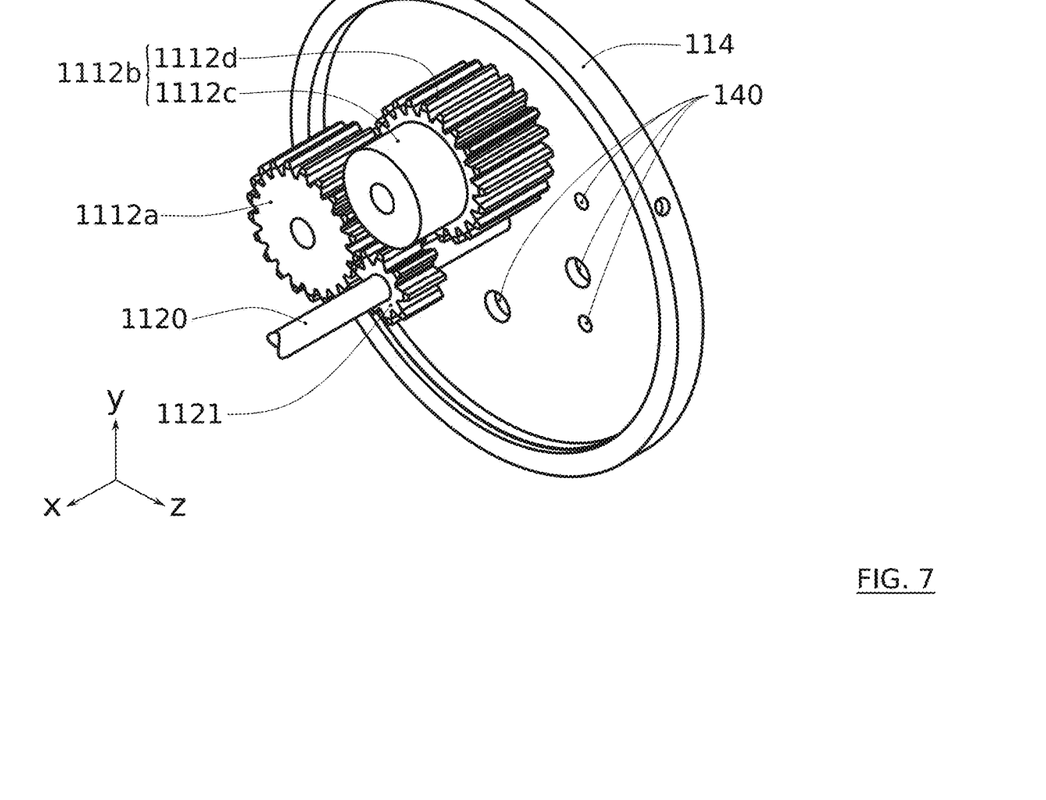
FIG. 7 shows a perspective, assembled view of a feature of the part of the bearing module shown in FIG. 5.

The reduction gear 1112 can comprise a second gear 1112b, cooperating with the first gear 1112a without cooperating with the pinion 1121, as shown in FIGS. 6 and 7. For example, when switching from the disengaged configuration into the engaged configuration, the first gear 1112a being driven such that it rotates about an axis parallel to the longitudinal axis of the first frame 10, in the direction S1, the second gear 1112b can be driven such that it rotates about an axis parallel to the longitudinal axis of the first frame 10, in the second direction S2. The second gear 1112b further cooperates with the inner rim 1111c of the second ring gear 1111, thus inducing the rotation thereof about the longitudinal axis x of the first frame 10, in the second direction S2, as shown in FIG. 5.

Moreover, the outer diameter D3 of the second gear 1112b can be substantially equal to the outer diameter D2 of the first gear 1112a, as shown in FIG. 6. The diameter of the inner rim 1110c of the first ring gear 1110 can be substantially equal to the diameter of the inner rim 1111c of the second ring gear 1111. Thus, the rotational motions of the first rod 1101 and of the second rod 1102 of each articulated arm 110 are synchronised.

Figure 8:
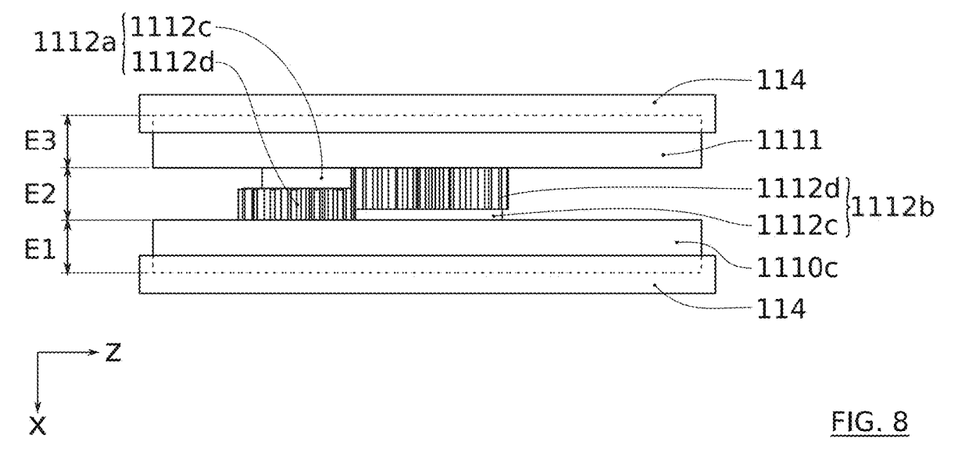
FIG. 8 shows an assembled view along the longitudinal axis of the robot, of the feature shown in FIG. 7.

As shown in FIGS. 7 and 8, the drive shaft 1120, the first gear 1112a and the second gear 1112b can extend between the two plates 114 of the bearing module 11, each in a direction parallel to the longitudinal axis x of the first frame 10. The drive shaft 1120, the first gear 1112a and the second gear 1112b can be mounted by being inserted into apertures 140 in each of the plates 140. The first gear 1112a and the second gear 1112b can each comprise a smooth portion 1112c and a toothed portion 1112d.

As shown more particularly in FIG. 8, three spaces E1, E2, and E3 can be described, these spaces being perpendicular to the longitudinal axis x of the first frame 10. A first space E1 can comprise the inner rim 1110c of the first ring gear 1110, part of the toothed portion 1112d of the first gear 1112a, at least part of the smooth portion 1112c of the second gear 1112b, and the pinion 1121, so as to allow the first ring gear 1110 to be driven such that it rotates in one of either the first direction S1 or the second direction S2, without driving the second ring gear 1111 such that it rotates in the same direction.

A second space E2 can comprise part of the toothed portion 1112d of the first gear 1112a and part of the toothed portion 1112d of the second gear 1112b. Thus, a rotation of the first gear 1112a in one of either the first direction S1 or the second direction S2, can drive the second gear 1112b such that it rotates in the other of either the first direction S1 or the second direction S2. A third space E3 can comprise the inner rim 1111c of the second ring gear 1111, part of the toothed portion 1112d of the second gear 1112b, and at least part of the smooth portion 1112c of the first gear 1112a, so as to allow the second ring gear 1111 to be driven such that it rotates in the other of either the first direction S1 or the second direction S2.

The bearing module 11 can further comprise a measuring device configured to measure the amplitude of the motion of the articulated arms 110, when alternately switching from the engaged configuration into the disengaged configuration. When the amplitude of the motion of the articulated arms 110 is measured when switching from the disengaged configuration into the engaged configuration, the amplitude being capable of being measured when switching from the engaged configuration into the disengaged configuration, the robot can be configured to stop the motor block 112 when the articulated arms 1130 are in the retracted position thereof. It is thus understood that there is no need for a stop. For example, the motor block 112 can comprise an encoder 1123, as shown in FIG. 3, configured to cooperate with the motor 1122 or the geared motor 1122. The motor 1122 or the geared motor 1122 is thus preferably a stepper motor or geared stepper motor.

Each bearing module can also be equipped with distance sensors, not shown in the drawings. These distance sensors can more particularly be configured to measure the distance between the first frame 10 and the wall 20 of the conduit 2. Thus, these sensors allow the machine to know its position within the conduit 2. From this position, the amplitude of motion of the articulated arms 1130 required to switch the bearing module 11 into the bearing portion 1100 engaged configuration thereof can thus be determined. Since this amplitude can be measured by the encoder 1123, the robot 1 can be configured to stop the motor block 112 when the articulated arms 130 are deployed to this amplitude.

Moreover, the articulated arms 110 can comprise an abutment detection device, not shown in the drawings. More particularly, the bearing portion 1100 of at least one articulated arm 110 of each bearing module 11 can be provided with this abutment detection device, so as to detect the bearing of the bearing portion 1100 against the wall 20 of the conduit 2. For this purpose, the abutment detection device can comprise a steel ball, capable of being applied against the wall 20, and which is integral with an internal spring. The internal spring is preferably disposed along the main direction of deployment of the at least one articulated arm 110. The bearing of the bearing portion 1100 can trigger a movement of the ball by compression of the spring. This movement can be measured by a sensor. This measurement can then be transmitted to a control system, for example in order to stop the motor block 112 when switching from a disengaged configuration into an engaged configuration.

According to one example, at least one, and preferably each of the articulated arms 110 can comprise a bearing element for the bearing of the arm 110 against the wall 20, not shown in the drawings. More particularly, this bearing element can be disposed at the distal end of the articulated arms 110, at the bearing portion 1100. The bearing element can comprise at least one, and preferably two extensions having, as a main component, a deformable material in contact with the wall 20, in the bearing portion 1100 engaged configuration. Thus, the stabilisation of the robot 1 by the bearing module 11 is improved. Moreover, the bearing element can thus be used to compensate for any ovalisation defect of the conduit 2, as is typical for conduits under traffic routes, which are subject to strong vibrations that can cause deformation thereto, for example under roads and motorways. Each extension of the bearing element can extend from the distal pivot 1103 in a direction parallel to the longitudinal axis x of the robot 1. The thickness of the bearing element can typically be a few mm, for example approximately 3 mm.

The invention is not limited to the aforementioned embodiments, and includes all the embodiments covered by the claims.

For example, the bearing module 11 can be provided such that it comprises more than three articulated arms, for example four or six.

LIST OF REFERENCES

1. Robot
10. First frame

10'. Second frame
100, 100'. Aperture
11. Bearing module
110. Articulated arm
1100. Bearing portion
1101. First rod
1101a. Distal end
1101b. Distal portion
1101c. Proximal portion
1101d. Proximal end
1102. Second rod
1102a. Distal end
1102b. Distal portion
1102c. Proximal portion
1102d. Proximal end
1103. Distal pivot
1104. Proximal pivot
1105. Intermediate pivot
111. Drive mechanism
1110. First ring gear
1110a. Outer rim
1110b. Connecting pivot
1110c. Inner rim
1111. Second ring gear
1111a. Outer rim
1111b. Connecting pivot
1111c. Inner rim
1111b. Connecting pivot
1112. Reduction gear
1112a. First gear
D2. Outer diameter of the first gear
1112b. Second gear
D3. Outer diameter of the second gear
1112c. Smooth portion
1112d. Toothed portion
112. Motor block
1120. Drive shaft
1121. Pinion
D1. Outer diameter of the pinion
1122. Motor or geared motor
1123. Encoder
113. Assembly element
1130. Fastening element
1130a. Aperture
1131. Panel
114. Holding plate
1140. Hole
12. Positioning system
2. Conduit
20. Wall
E1. First space
E2. Second space
E3. Third space

The invention claimed is:

1. A robot for exploring a conduit, the robot comprising a first frame and a second frame, the first frame and the second frame each comprise a bearing module provided with a plurality of articulated arms, each articulated arm comprising a bearing portion that can be applied against a wall of the conduit, the bearing portion being able to be displaced by a movement of an articulated arm, each bearing module being configured to switch alternately from a bearing portion engaged configuration into a bearing portion disengaged configuration, each articulated arm being deployed further in said engaged configuration than in said disengaged configuration, each bearing module is further configured such that the articulated arms are disposed in a plane perpendicular to a longitudinal axis of at least one of either the first frame or the second frame, and such that the articulated arms are capable of at least partially moving between said engaged configuration and said disengaged configuration, via a rotational motion, through at least one angular sector, about an axis parallel to the longitudinal axis of the at least one of either the first frame or the second frame, each articulated arm comprises a first rod and a second rod, wherein that the first rod is configured to be articulated such that it rotates with the second rod in a direction parallel to the longitudinal axis of the at least one of either the first frame or the second frame, by at least a distal pivot and a proximal pivot, and wherein the first rod and the second rod each comprise a distal portion and a proximal portion, the distal portion and the proximal portion being articulated such that they rotate by an intermediate pivot, in a direction parallel to the longitudinal axis of the at least one of either the first frame or the second frame, the intermediate pivot being located between the distal pivot and the proximal pivot, along each of the first rod and second rod.

2. The robot according to claim 1, wherein a distal end of the first rod is articulated with a distal end of the second rod by the distal pivot, the distal end of the first rod and the distal end of the second rod forming the bearing portion of each articulated arm.

3. The robot according to claim 1, wherein the bearing module comprises a drive mechanism and a motor block, the drive mechanism being configured to be driven by the motor block, and to induce the rotational motion of at least part of each articulated arm when switching alternately from said engaged configuration into said disengaged configuration.

4. The robot according to claim 3, wherein, with each articulated arm comprising a first rod and a second rod, the first rod being configured to be articulated such that it rotates with the second rod, in a direction parallel to the longitudinal axis of the at least one of either the first frame or the second frame, the drive mechanism comprises a first ring gear, the first rod of each articulated arm being mounted on the first ring gear so as to be free to rotate, through at least one angular sector, relative to the first ring gear about an axis parallel to said longitudinal axis, the first ring gear being further configured to be driven such that it rotates in a first direction of rotation when switching from said disengaged configuration into said engaged configuration, and in a second direction when switching from said engaged configuration into said disengaged configuration, the second direction of rotation being opposite to the first direction of rotation.

5. The robot according to claim 4, wherein the drive mechanism further comprises a reduction gear, configured at least to induce rotation of the first ring gear.

6. The robot according to claim 5, wherein the motor block comprises a pinion, and the reduction gear comprises a first gear cooperating on the one hand with the pinion so as to be driven such that it rotates about an axis of rotation parallel to the longitudinal axis of the pinion, and on the other hand with the first ring gear.

7. The robot according to claim 4, wherein the drive mechanism comprises a second ring gear, the second rod being capable of being mounted on the second ring gear so as to be free to rotate, through at least one angular sector, relative to the second ring gear, about an axis parallel to the longitudinal axis of the at least one of either the first frame or the second frame, the second ring gear being configured to be driven in the second direction of rotation when switching from said disengaged configuration into said engaged configuration, and in the first direction when switching from said engaged configuration into said disengaged configuration.

8. The robot according to claim 7, wherein, with the drive mechanism comprising a reduction gear, the reduction gear comprising a first gear cooperating on the one hand with the pinion, so as to be driven such that it rotates about an axis of rotation parallel to the longitudinal axis of the pinion, and on the other hand with the first ring gear, the reduction gear further comprises a second gear cooperating on the one hand with the first gear, so as to be driven such that it rotates about an axis of rotation parallel to the longitudinal axis of the pinion, and on the other hand with the second ring gear.

9. The robot according to claim 3, wherein the bearing module comprises at least one assembly element configured to maintain the drive mechanism assembled.

10. The robot according to claim 9, wherein, with the drive mechanism comprising a first ring gear and a second ring gear, the first ring gear and the second ring gear being disposed between a first plate and a second plate, the at least one assembly element is mounted on the first plate and the second plate so as to maintain the drive mechanism assembled.

11. The robot according to claim 10, wherein the at least one assembly element comprises a first fastening element mounted on the first plate, a second fastening element mounted on the second plate, and a panel mounted on the first fastening element and the second fastening element, the panel being configured such that it is not directly in contact with the first ring gear and the second ring gear.

12. The robot according to claim 3, wherein the motor block comprises a stepper motor or a geared stepper motor, and an encoder, the encoder cooperating with the stepper motor or the geared stepper motor, so as to measure a degree of deployment of the articulated arms, when alternately switching from the bearing portion disengaged configuration into the bearing portion engaged configuration.

13. A robot for exploring a conduit, the robot comprising a first frame and a second frame, the first frame and the second frame each comprise a bearing module provided with a plurality of articulated arms, each articulated arm comprising a bearing portion that can be applied against a wall of the conduit, the bearing portion being able to be displaced by a movement of an articulated arm,
  each bearing module being configured to switch alternately from a bearing portion engaged configuration into a bearing portion disengaged configuration, each articulated arm being deployed further in said engaged configuration than in said disengaged configuration,
  each bearing module is further configured such that the articulated arms are disposed in a plane perpendicular to a longitudinal axis of at least one of either the first frame or the second frame, and such that the articulated arms are capable of at least partially moving between said engaged configuration and said disengaged configuration, via a rotational motion, through at least one angular sector, about an axis parallel to the longitudinal axis of the at least one of either the first frame or the second frame,
  each articulated arm comprises a first rod and a second rod,
  wherein the first rod is configured to be articulated such that the first rod rotates with the second rod in a direction parallel to the longitudinal axis of the at least one of either the first frame or the second frame, by at least a distal pivot and a proximal pivot,
  wherein the bearing module comprises a drive mechanism and a motor block, the drive mechanism being configured to be driven by the motor block, and to induce the rotational motion of at least part of each articulated arm when switching alternately from said engaged configuration into said disengaged configuration, and
  wherein the drive mechanism comprises a first ring gear, the first rod of each articulated arm being mounted on the first ring gear so as to be free to rotate, through at least one angular sector, relative to the first ring gear about an axis parallel to said longitudinal axis, the first ring gear being further configured to be driven such that it rotates in a first direction of rotation when switching from said disengaged configuration into said engaged configuration, and in a second direction when switching from said engaged configuration into said disengaged configuration, the second direction of rotation being opposite to the first direction of rotation.

14. A robot for exploring a conduit, the robot comprising a first frame and a second frame, the first frame and the second frame each comprise a bearing module provided with a plurality of articulated arms, each articulated arm comprising a bearing portion that can be applied against a wall of the conduit, the bearing portion being able to be displaced by a movement of an articulated arm,
  each bearing module being configured to switch alternately from a bearing portion engaged configuration into a bearing portion disengaged configuration, each articulated arm being deployed further in said engaged configuration than in said disengaged configuration,
  each bearing module is further configured such that the articulated arms are disposed in a plane perpendicular to a longitudinal axis of at least one of either the first frame or the second frame, and such that the articulated arms are capable of at least partially moving between said engaged configuration and said disengaged configuration, via a rotational motion, through at least one angular sector, about an axis parallel to the longitudinal axis of the at least one of either the first frame or the second frame,
  each articulated arm comprises a first rod and a second rod,
  wherein the first rod is configured to be articulated such that the first rod rotates with the second rod in a direction parallel to the longitudinal axis of the at least one of either the first frame or the second frame, by at least a distal pivot and a proximal pivot,
  wherein the bearing module comprises a drive mechanism and a motor block, the drive mechanism being configured to be driven by the motor block, and to induce the rotational motion of at least part of each articulated arm when switching alternately from said engaged configuration into said disengaged configuration,
  wherein the bearing module comprises at least one assembly element configured to maintain the drive mechanism assembled, and
  wherein, with the drive mechanism comprising a first ring gear and a second ring gear, the first ring gear and the second ring gear being disposed between a first plate and a second plate, the at least one assembly element is mounted on the first plate and the second plate so as to maintain the drive mechanism assembled.

* * * * *